United States Patent [19]

Sestero

[11] Patent Number: 4,475,096
[45] Date of Patent: Oct. 2, 1984

[54] APPARATUS FOR GENERATING INTENSE, QUASI-STATIONARY MAGNETIC FIELDS WITH COMPACT TOROIDAL GEOMETRY

[75] Inventor: Arrigo Sestero, Rome, Italy

[73] Assignee: Comitato Nazionale Per La Ricerca E Per Lo Sviluppo Dell'Energia Nucleare E Delle Energie Alternative, Rome, Italy

[21] Appl. No.: 433,877

[22] Filed: Oct. 13, 1982

[30] Foreign Application Priority Data

Oct. 14, 1981 [IT] Italy .................. 48482 A/81

[51] Int. Cl.³ .............................................. H01F 5/00
[52] U.S. Cl. ................................... 335/299; 336/228; 336/229
[58] Field of Search ............... 335/209, 216, 296, 299, 335/300; 336/73, 222, 223, 227, 228, 229

[56] References Cited

U.S. PATENT DOCUMENTS 3,626,341 12/1971 Dao ..................................... 335/299
4,344,057 8/1982 Stekly et al. ........................ 335/299

Primary Examiner—George Harris
Attorney, Agent, or Firm—Cushman, Darby & Cushman

[57] ABSTRACT

Apparatus comprising a toroidal magnet whose conductive layers closest to the axis of symmetry are supported everywhere by a structural material of high mechanical strength, and synchronous press means exerting a compressive force parallel to the said axis of symmetry, the apparatus achieving, in use, quasi-isotropy of the stress tensor in the most critically loaded part of the magnet.

8 Claims, 3 Drawing Figures

APPARATUS FOR GENERATING INTENSE, QUASI-STATIONARY MAGNETIC FIELDS WITH COMPACT TOROIDAL GEOMETRY

The present invention relates to an apparatus for generating intense, quasi-stationary magnetic fields in a compact toroidal geometry, with a structure which is self-compensated for mechanical stress. The generation of such magnetic fields is of interest, as is known, in the field of controlled thermo-nuclear fusion research, with particular reference to the "tokamak" configuration.

It is known that the plastic yielding of construction materials, when subjected to excessive mechanical loads, does occur not because of the effect of the principal stresses, however high these may be, but because of the shear stresses which are generated as a result of the characteristics of anisotropy of the stress tensor. This finds clear confirmation in the so-called "Von Mises criterion", quite widely used in mechanical engineering for evaluating whether or not a given state of stress can lead to the yielding of the material under consideration. In the said criterion, the absence of yielding is associated with the occurence of the following inquality:

$$(\sigma_1-\sigma_2)^2+(\sigma_2-\sigma_3)^2+(\sigma_3-\sigma_1)^2<2\sigma_0^2$$

where $\sigma_1$, $\sigma_2$, $\sigma_3$ are the principal stresses, and $\sigma_0$ is a constant of the material under consideration, defining the so-called "yield load for pure tensile stress". Notice how, in effect, the expression of the left-hand side depends solely on the moduli of the differences between the principal stresses (and hence on the degree of anisotropy of the stress tensor) and not on the principal stresses themselves.

It must now be made clear that for each toroidal magnet in which the conductor is self-supporting, the state of stress of the conductor itself is necessarily characterised by a strongly anisotropic stress tensor, since, introducing the toroidal coordinates $\rho$ (small radius), $\theta$ (small azimuth), and $\phi$ (large azimuth), compressive stresses in the $\rho$ and $\phi$ directions are inevitably associated with a strong tensile stress in the $\theta$ direction.

The latter stress, giving up the condition that the conductor be entirely self-supporting, can be partially reduced by "unloading" it on a suitable structural material having a high mechanical strength. The structural material can be located either between, or outside, the turns of the conductor. In the first of these solutions, the transfer of stress from the conductor to the structural material occurs through shear forces, while, in the second, it occurs through compressive forces. Both of these solutions have been applied in actually built, or designed, magnets.

With the mechanical coupling of the conductor to a suitable structural material one can therefore, as was seen, reduce the perilousness of the stress state in the conductor, but the degree of anisotropy of the stress tensor in the latter still remains high, since at least one of the principal directions always remains characterised by a null (or reduced) stress, while a strong compressive stress acts in at least one of the two other principal directions.

On the basis of what has been stated above, if it is desired to go beyond the present established performances in the construction of toroidal magnets, it is necessary for the tensile stress in the $\theta$ direction within the conductor not only to be reduced or nullified but to be actually transformed into a compressive stress, of magnitude comparable to the compressive stresses which act in the $\rho$ and $\phi$ directions. To this end, the application of the normal precompression techniques to the conductor can be shown to be an inadequate device: the precompression required would in fact be so strong that, when not balanced by the magnetic pressure (that is, if suitable currents were not circulating in the windings), the precompression would itself cause the crushing of the magnet.

In order to avoid the illustrated, unfavourable features of the present known art, it is thus necessary to introduce radical innovations.

The object of the present invention is precisely that of avoiding the aforementioned limitations and disadvantages of the prior art.

According to the invention, the magnet is to be subjected to a programmed external compression, timed so as to produce the maximum effect at the moment at which the excitation of the magnet is at maximum; while otherwise remaining approximately proportional to the value of the magnetic pressure in the magnet. In principle, this can be achieved by designing a suitable external press system, synchronised with the waveform of the current in the magnet.

In the case of a rather fat toroidal magnet, the achievement of conditions of quasi-isotropy of the stress tensor throughout the volume of the conductor in the way indicated above would pose problems of considerable complexity. Fortunately, it is not necessary to achieve the said quasi-isotropy throughout the volume of the conductor, since the stresses in the outer zone of the magnet (the one farthest away from the axis of symmetry) are, in themselves, sufficiently small; thus it suffices to achieve conditions of quasi-isotropy of the stress tensor only in the most critically loaded zone of the magnet (that is the innermost part, closest to the axis of symmetry). In this zone, the direction in which the tensile stress which must be withstood arises is, on average, approximately the "vertical" direction, that is the direction parallel to the axis of symmetry. A single external press, acting on the said zone and along the said direction, is hence already sufficient to ensure a marked improvement in the performance of the magnet.

According to the present invention the said press, programmed in time, is combined with a particular configuration of the central part of the magnet. This particular configuration is obtained by structuring the internal (central) part of the magnet so that the last layer of the conductor, the one closest to the axis of symmetry of the magnet, is supported over its entire external face, without a break in continuity, by a structural material of high mechanical strength, which entirely fills the space available up to the axis of symmetry, or is at least of a sufficient thickness to act mechanically against the conductor itself with a considerable normal force. Thus there is no "free" surface of the conductor, which otherwise would result in a zero normal component of the stress tensor, and hence in a high anisotropy thereof. If the conductor itself is made to fill most of the available space, a further advantage is obtained in that the total section available for the conductor in the central part of the magnet is close to the maximum possible theoretical value, and hence the Joule heating is minimised, which means that the duration of the magnetic field produced is close to the maximum achievable.

Detailed calculations, both analytical and numerical, have shown that the aforementioned combination of the said time-programmed press and of the said particular configuration of the central part of the magnet, makes it possible to contain a magnetic pressure which is typically twice that achievable, for the same mechanical properties of the conductor material, in magnets of conventional design.

Since the heating of the conductor by the Joule effect is considerable, the added stresses which arise in the conductor material because of differential thermal expansion cannot be neglected (and in effect have been taken into account in the numerical calculations). In particular it is necessary to avoid the current becoming denser along the entire inner edge of the magnet due to the "skin effect". This may be achieved by dividing the thickness of the conductor radially into various layers (at least two layers are required, and it is better if there is a larger number thereof). It is also necessary for the section of each of these layers to be kept as constant as possible, at least in the most critically stressed zone of the magnet, so that the Joule heating is as uniform as possible there. For this purpose, the edges of each layer in the zone closest to the axis of symmetry are disposed parallel to the latter, that is in a vertical direction, eventually to bend sharply towards the horizontal direction; after this bending, the layers taper in thickness up to a certain distance, in order to compensate for the increase in the linear dimension of the individual windings in the $\phi$ direction, which occurs due to the effect of the toroidal geometry. However, outside the most critically stressed zone, the various layers have uniform thickness, since the differential thermal stresses are a less severe problem there. It should be noted that, fortunately, the configuration mentioned above, whereby a zone of vertical conductor alignment is followed by a sharp turn towards the horizontal direction, is also rather advantageous for the purpose of optimising the action of the press on the conductor. Indeed, over a large part of the most critically stressed zone of the magnet, it is found that the direction of the tensile stress which must be withstood is almost exactly aligned with the direction of action of the press.

In the complex problem of the mechanical behaviour of the magnet, there are naturally aspects which cannot be entirely clarified by means of sole calculations, however accurate these are. Among these aspects, the most important is probably the mechanical behaviour of the insulating material which is to be interposed between the turns of the conductor. With regard to this aspect, the most suitable insulating material would be presumably a strong textile of inorganic fibres.

To complete the description of the magnet, the important problem of the foreseen assembly procedure must finally be discussed. The toroidal channel of the magnet which is left free must naturally house other components necessary for the various possible applications of the magnet. These components certainly cannot be introduced in situ in the assembled magnet (as is the normal procedure in other magnets of conventional type) because of the obvious difficulty of access for the pieces and tools into the inside of a compact coil system such as that of the magnet according to the present invention. Consequently, it has been foreseen that the components required for the application are assembled first, and subsequently the toroidal field windings are assembled thereabout. This naturally means that the individual turns of the conductor are cut at certain points and are then recombined about the already assembled internal components. Notice that the need to carry out these cuts in the coil plates is here no problem, neither from a mechanical nor from an electrical point of view, contrary to what happens in other magnets of conventional type: indeed, in the configuration adopted for the magnet according to the present invention, the conductor is subjected throughout only to compressive stresses, which renders superfluous the re-establishment of mechanical continuity between the cut parts of the coil plates, and facilitates the electrical contact therebetween.

For the implementation of the aforementioned synchronous external press, whose action on the magnet has already been explained, various possibilities have been examined. Mechanical and hydraulic solutions (possible in principle), because of their complexity, cost and poor reliability are certainly less preferable than a magnetic type of solution, in which the necessary force is produced by the repulsion arising between pairs of parallel windings in which the current is circulating in opposite directions. The geometry of the windings may be such that the current has a toroidal direction, and the magnetic field generated thereby consequently has a radial direction. Of each coil pair, the winding closest to the toroidal magnet acts on it through a suitable steel structure, built so as to concentrate the force on the central part of the magnet; the other winding is instead leaning against a number of sturdy clamp structures, arranged all around the magnet.

The facility and reliability with which the waveform of the current in the windings of the press can be subserved to the waveform of the current in the winding of the toroidal magnet (for example by disposing the two families of windings in series with each other) endows the magnetmagnetic press complex with highly secure operational conditions which certainly cannot be equalled by resorting to mechanical or hydraulic solutions for the press.

In conclusion, the present invention allows the constructing of cryogenic, non-superconducting, quasi-stationary magnets of compact toroidal form, endowed with operational parameters which are considerably better than those achieveable in terms of the presently known art. In particular, as stated above, it is possible to achieve values of the magnetic pressure containable by the mechanical structure of the magnet (the degree of this containable magnetic pressure being the most important operational parameter) of about twice the maximum achievable in magnets constructed (or even simply designed) up till now for similar purposes.

From what has been stated above it is clear that the essential concept of the present invention lies in associating an external synchronised press with a particular configuration of the most stressed central zone of the toroidal magnet (the press being subserved to the waveform of the current in the magnet) in such a way as to make the stress tensor quasi-isotropic in the most critically loaded part of the magnet.

Hence, the apparatus according to the present invention is essentially characterised in that it comprises: a toroidal magnet, in the windings of which the conductor layers closest to the central axis of symmetry of the said magnet are supported everywhere, without a break in continuity, on a structural material of high mechanical strength, apt to react mechanically on the conductor itself with considerable normal force; and synchronous press means acting from outside on the said toroidal magnet, subserved to the waveform of the current in the said magnet, and exerting a compressive force in the direction parallel to the axis of symmetry of the magnet, the association of the said toroidal magnet with the said synchronous press means providing, in operation of the apparatus, quasi-isotropy of the stress tensor in the most critically loaded part of the magnet.

The present invention will now be further illustrated by the following description of one embodiment, given by way of a non-limiting example with reference to the appended drawings, in which.

Figure 1:
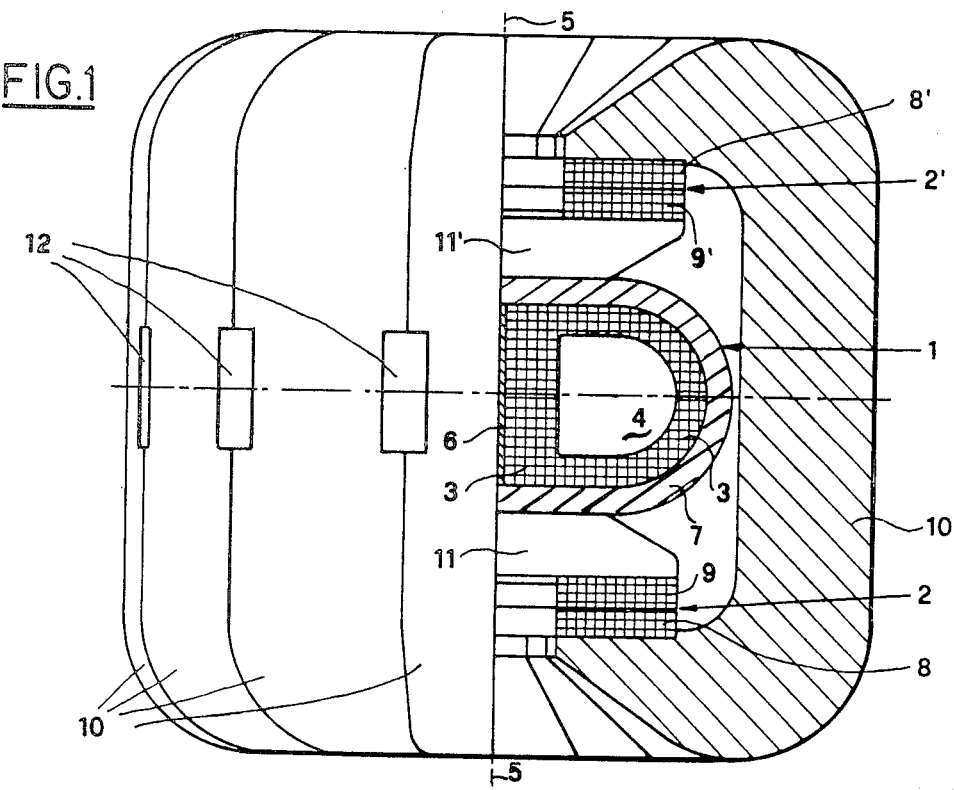
FIG. 1 is a schematic vertical representation, partially in axial section, and partially in elevation, of the apparatus according to the present invention.
Figure 2:
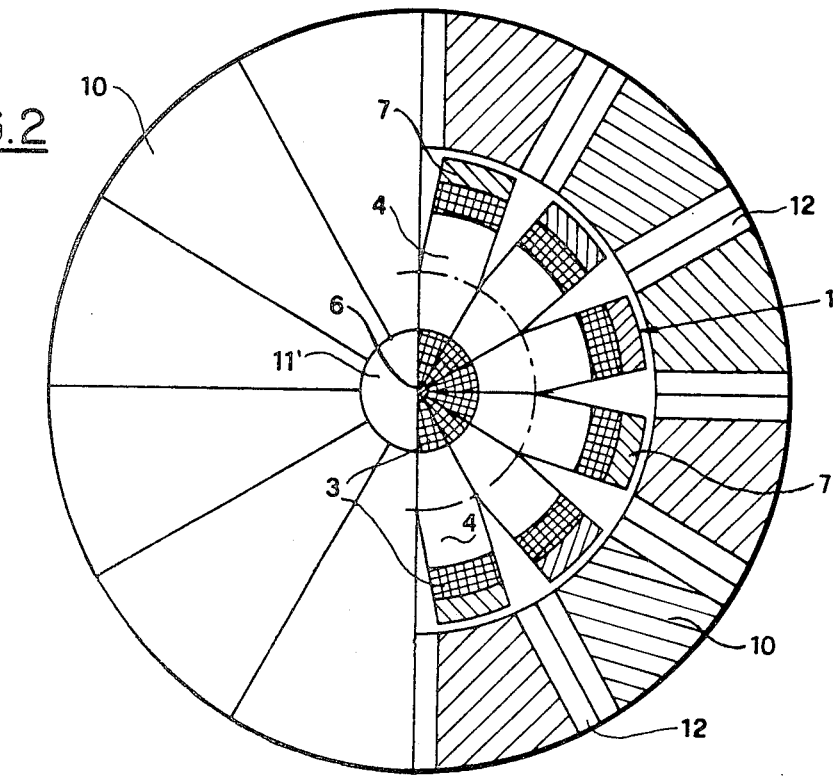
FIG. 2 is a schematic horizontal representation, partially in section and partially in plan view from above, of the apparatus according to FIG. 1.

With reference to the drawings, the apparatus according to the present invention comprises essentially a toroidal magnet, generally indicated as 1, and two magnetic press coil systems, generally indicated as 2 and 2', respectively, the first located below and the second above the magnet 1, and coaxial with the latter.

The toroidal magnet 1 consists of a certain number (this number is 12 in the case shown) of copper coils 3, made up of several layers, each of which coils defines one of the twelve radially-disposed sectors forming the toroidal magnet. The complex of all the windings 3 defines the toroidal cavity 4. As is seen in the drawings, the copper of the windings 3 occupies the entire space up to the central vertical axis of symmetry 5 of the magnet, with the exception of a very small axial cylindrical space, the latter being occupied by a cylinder 6 of steel or other structural material of high mechanical strength. A jacket 7 of steel or other high strength structural material surrounds all the windings 3 from above, below and on the side.

As is seen, the conductor of the windings 3 has no "free" surface; in particular, the conductor is supported all over, without any break in continuity, at its surface facing the axis of symmetry, by the high strength structural material of the cylinder 6.

Each of the press structures 2, 2' comprises two toroidal windings 8, 9 and 8',9' respectively, the current circulating therein having a toroidal direction and the magnetic field produced thereby being radial. The windings 8 and 8' are anchored to large C-shaped steel pillars 10, arranged in a ring completely surrounding the magnet. Each pair of windings in the press structures is fed with anti-parallel currents which generate repulsive forces between the windings themselves in a direction parallel to the axis of symmetry 5 of the toroidal magnet 1. The windings 9 and 9' transmit the exerted force to the toroidal magnet 1 through the steel structures 11 and 11' respectively, which couple the magnet to the press structures mechanically, and which are designed to concentrate the said force on the central part of the magnet. The distribution of the currents in the press windings can be optimised so that a practically uniform compressive force is transmitted.

Auxiliary conductors, not shown in the drawings, suitably channel the magnetic flux generated by the press windings so as to avoid spurious fields reaching the zone within the magnet (a perturbing effect which would be harmful for the practical applications of the apparatus). Consequently, a large part of the magnetic flux must find its way out through the external steel pillars 10, which means, among other things, that there must not be electrical continuity between the pillars in the toroidal sense (at least for those parts of the pillars which are facing the press windings).

The magnetic pressure which acts between the press windings is typically only a quarter of the maximum existing within the toroidal magnet. The subservience of the waveform of the current in the press windings to the waveform of the current in the windings of the toroidal magnet is brought about with maximum reliability and optimum operational results by connecting the press and magnet windings in series. Finally it is noted that access to the toroidal cavity 4 is ensured through the windows 12 in the pillars 10.

Figure 3:
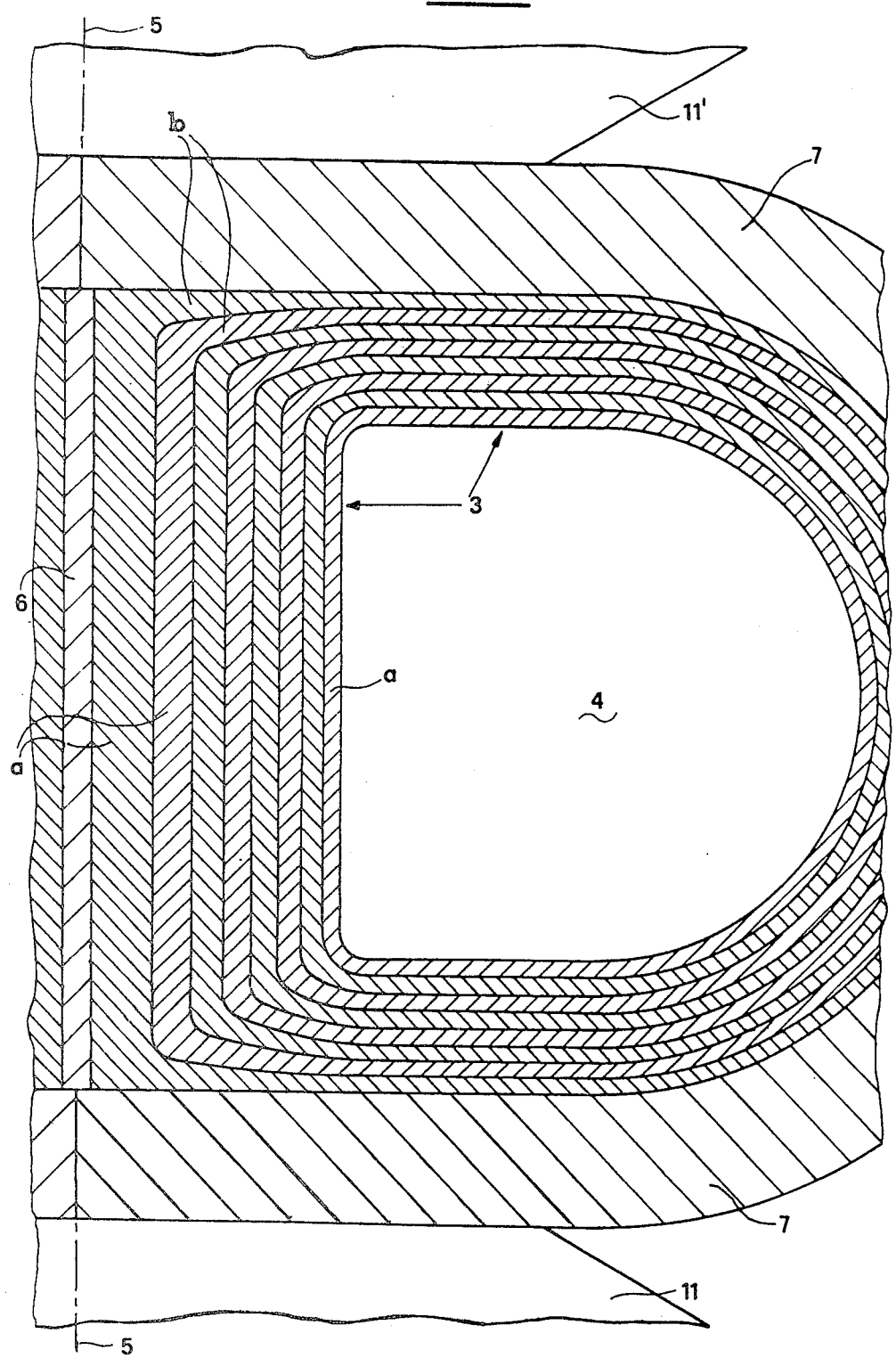
FIG. 3 is a schematic representation in axial vertical section, on an enlarged scale, of part of the apparatus according to the two preceding figures.

Passing now to FIG. 3, this shows a coil 3 of the toroidal magnet in section and on an enlarged scale with respect to the preceding figures, in order to exhibit the special conformation of the eight layers which compose it. One recalls that, as already stated, in order to avoid the current becoming denser along the internal edge of the magnet due to the "skin effect", it is necessary to divide the thickness of the coil conductor into various layers in the radial direction. To the end of keeping the Joule heating as uniform as possible at least in the most critically stressed zone of the winding (the part closest to the axis of symmetry 5 of the magnet), the edges of each layer, as is seen, are there oriented vertically, that is, parallel to the axis of symmetry (see the zones indicated a in FIG. 3); the edges then bend sharply towards the horizontal direction and, after bending, there is a tapering in the layer thickness up to a certain distance (zone b) in order to compensate for the increase in the linear dimension of the coils in the $\phi$ direction which occurs due to the toroidal geometry. However, outside this most critically stressed zone, the various layers continue, as is seen, with uniform thickness, since the differential thermal stresses constitute a less severe problem there. Such a configuration, as previously noted, is also very advantageous for optimising the action of the press on the conductor, since over a good part of the most critically loaded zone of the magnet the direction of the tensile stress to be withstood is in fact almost exactly aligned with the direction of action of the press.

Finally the most important parameters of a practical embodiment of the present invention will be given (finalized to the designing of a "tokamak"-type device for thermonuclear fusion research):

Magnet major radius: 0.40 meters
Magnet internal minor radius: 0.20 meters
Maximum magnetic field (at the internal edge of the magnet): 35 tesla
Magnetic field at the centre of the internal toroidal cavity of the magnet: 17.5 tesla
Total current in the magnet: 35 mega-ampere-turns
Maximum heating allowed in the conductor: from $-200°$ C. to $+100°$ C.
Effective pulse duration (at constant current): 1.2 seconds
Actual pulse duration (under constant supplied power): 2.4 seconds
Magnetic energy in the toroidal windings: 87 megajoules
Ohmic energy dissipated in the toroidal windings: 136 megajoules
Total energy for the toroidal windings: 223 megajoules
Magnetic energy in the press: 27 megajoules
Ohmic energy dissipated in the press: 27 megajoules Total energy for the press: 54 megajoules
Total energy for the magnet and press: 277 megajoules
Total press thrust: 14,000 metric tons
Maximum magnetic field in the press: 17.5 tesla
External height of the press: 3 meters
External diameter of the press: 3 meters
Weight of the whole complex: 120 metric tons
Equivalent pressure for the maximum field in the press: 12 kg/mm$^2$
Equivalent pressure for the maximum field in the magnet: 50 kg/mm$^2$
Maximum principal stress in the conductor: 90 kg/mm$^2$
Maximum equivalent Von Mises stress in the conductor: 30 kg/mm$^2$ It is clear that numerous different variants and modifications can be made to the illustrated embodiment of the present invention, given by way of example, by those skilled in the art, without departing from the spirit of the invention; it is understood that these variants and modifications all fall within the scope of the said invention.

I claim:

1. Apparatus for generating intense, quasi-stationary magnetic fields with compact toroidal geometry, characterised in that it comprises: a toroidal magnet in whose coils the layers of conductor closest to the central axis of symmetry of the said magnet are supported everywhere, without a break in continuity, on a structural material of high mechanical strength, apt to react mechanically on the conductor itself with considerable normal force; and synchronous press means acting externally on the said toroidal magnet, subserved to the waveform of the current in the magnet, and exerting a compressive force in a direction parallel to the magnet axis of symmetry, the association of the said toroidal magnet with the said synchronous press means bringing about, in operation of the apparatus, quasi-isotropy of the stress tensor in the most critically loaded parts of the magnet.

2. Apparatus according to claim 1, characterised in that the said structural support material completely fills the space available in the central part of the magnet, from the external surface of the conducting material up to the magnet axis of symmetry.

3. Apparatus according to claim 1, characterised in that the said structural support material is formed as a hollow body which has a thickness sufficient to react mechanically on the conductor with considerable normal force.

4. Apparatus according to claim 1, characterised in that the said synchronous press means consist of one or more pairs of magnetic windings, the windings in each pair carrying anti-parallel currents.

5. Apparatus according to claim 4 characterised in that in the said magnetic windings of the press means the waveform of the current is subserved to the waveform of the current in the toroidal magnet windings by disposing the two families of windings in series with each other.

6. Apparatus according to claim 4, characterised in that the said magnetic windings of the press means are disposed with their axis of symmetry vertical, and coincident with the magnet axis of symmetry.

7. Apparatus according to claim 1, characterised in that the thickness of the conductor in each coil of the toroidal magnet is divided into various layers in the radial sense, the section of each of these layers being almost constant at least in the central part of the magnet, which is most critically stressed, the edges of each layer being disposed parallel to the axis of symmetry of the magnet in the said central part of the magnet, and being then bent in a direction almost perpendicular to the axis of symmetry, the thickness of the layer being tapered after the bending so as to maintain a constant section of the layer.

8. Apparatus according to claim 1, characterised in that the conductor layers in the windings of the toroidal magnet are cut at certain points so as to allow them to be assembled after the other components necessary for the practical applications of the magnet have been put together within the toroidal cavity defined by the magnet itself.

* * * * *

UNITED STATES PATENT AND TRADEMARK OFFICE
CERTIFICATE OF CORRECTION

PATENT NO. : 4,475,096

DATED : October 2, 1984

INVENTOR(S) : Arrigo SESTERO

It is certified that error appears in the above-identified patent and that said Letters Patent is hereby corrected as shown below:

On the Title Page re Priority Data [Item 30]

Read "Oct. 14, 1981 [IT]   Italy .....48 482 A 81"  as

-- Oct. 14, 1981 [IT]   Italy .....49 482 A 81 --

Signed and Sealed this

Tenth Day of September 1985

[SEAL]

Attest:

DONALD J. QUIGG

*Attesting Officer*   Acting Commissioner of Patents and Trademarks - Designate